(12) United States Patent
Lee

(10) Patent No.: US 8,132,820 B2
(45) Date of Patent: Mar. 13, 2012

(54) LOWER ARM MOUNTING UNIT FOR MULTI-LINK SUSPENSION SYSTEM

(75) Inventor: Byungkyu Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 12/622,285

(22) Filed: Nov. 19, 2009

(65) Prior Publication Data

US 2011/0025011 A1 Feb. 3, 2011

(30) Foreign Application Priority Data

Jul. 31, 2009 (KR) .................. 10-2009-0070978

(51) Int. Cl.
*B62D 7/18* (2006.01)
(52) U.S. Cl. ............ 280/93.512; 280/93.511; 280/93.51
(58) Field of Classification Search ............ 280/93.512, 280/93.511, 93.51
See application file for complete search history.

(56) References Cited

U.S. PATENT DOCUMENTS

| | | | | |
|---|---|---|---|---|
| 2,208,325 | A | * | 7/1940 | Krutsch ............ 403/138 |
| 2,757,015 | A | * | 7/1956 | Latzen .............. 280/93.511 |
| 3,365,213 | A | * | 1/1968 | Peickii et al. ....... 280/93.511 |
| 5,624,011 | A | * | 4/1997 | White et al. ........... 188/329 |
| 5,782,484 | A | * | 7/1998 | Kuhn, Jr. .............. 280/124.142 |
| 6,116,626 | A | * | 9/2000 | Cherry et al. ......... 280/124.135 |
| 6,431,569 | B2 | * | 8/2002 | Handa .................. 280/124.138 |
| 7,150,462 | B2 | * | 12/2006 | Bortz et al. .......... 280/124.125 |
| 2003/0107201 | A1 | * | 6/2003 | Chun ..................... 280/124.135 |
| 2004/0026884 | A1 | * | 2/2004 | Barry ....................... 280/93.51 |
| 2007/0187917 | A1 | * | 8/2007 | Hasegawa et al. ........ 280/93.51 |

FOREIGN PATENT DOCUMENTS

| | | |
|---|---|---|
| JP | 2007-126005 A | 5/2007 |
| KR | 10-2007-0028672 A | 3/2007 |
| KR | 10-2007-0042732 A | 4/2007 |
| KR | 10-2007-0062729 A | 6/2007 |
| KR | 10-0794463 B1 | 12/2007 |

* cited by examiner

*Primary Examiner* — Paul N Dickson
*Assistant Examiner* — Nicole Verley
(74) *Attorney, Agent, or Firm* — Morgan, Lewis & Bockius LLP

(57) ABSTRACT

A lower arm mounting unit for a multi-link suspension system having a knuckle rotatably supporting a wheel, and first and second lower arms connecting the knuckle to a vehicle body, may include a pair of mounting protrusions formed to the knuckle, a first ball stud connecting an end portion of the first lower arm to the pair of the mounting protrusions, and a second ball stud connecting an end portion of the second lower arm to the pair of the mounting protrusions and the first ball stud by inserting the end portion of the second ball stud between the pair of the mounting protrusions, the end portion of the first ball stud, and the knuckle.

8 Claims, 4 Drawing Sheets

LOWER ARM MOUNTING UNIT FOR MULTI-LINK SUSPENSION SYSTEM

CROSS-REFERENCE TO RELATED APPLICATION

The present application claims priority to Korean Patent Application No. 10-2009-0070978 filed on Jul. 31, 2009, the entire contents of which are incorporated herein for all purposes by this reference.

BACKGROUND OF THE INVENTION

1. Field of the Invention

The present invention relates to a lower arm mounting unit for a multi-link suspension system of a vehicle. More particularly, the present invention relates to a lower arm mounting unit that is provided with a plurality of lower arm crossly disposed each other so that the lower arms are able to move independently and also layout of the lower arm mounting unit can be optimized.

2. Description of Related Art

Generally, a suspension system of a vehicle is provided with a link or links for connecting a vehicle body, it supports in a vertical direction using a chassis spring and a shock absorber, and it can modulate horizontal relative movement of a vehicle body and a wheel by modulating rigidity and flexibility.

The suspension system is required to provide a comfort characteristic by preventing irregular input of various road conditions when it is driven, and stable characteristics when it turns or brakes.

Positions of a wheel according to suspension geometry is a key factor for satisfying the required conditions, and positions of a wheel can be variable according to relative movement between a wheel and a vehicle body and performance of a vehicle is influenced by the position of a wheel.

Recently a multi-link type suspension system, using a plurality of link for effectively reducing influence according to irregular input of various road conditions, has been widely used.

FIG. 4 is a perspective view of a conventional lower arm mounting unit for a multi-link type suspension system.

Referring to the drawing, a conventional lower arm mounting unit for a multi-link type suspension system includes lower arms 103 and 105 connecting a knuckle 101 to a vehicle body, and the lower arms 103 and 105 are mounted to the knuckle 101 by a lower arm mounting unit 110.

The lower arm mounting unit 110 includes a ball stud 111 that is assembled to the lower arm 103 and 105 and a nut 113 for configuring the ball stud 111.

The lower arms 103 and 105 of the conventional lower arm mounting unit 110 for a multi-link type suspension system are separately mounted to a lower portion of the knuckle 101 so that the lower arms 103 and 105 are able to move relatively and independently each other.

And a dust cover 115 is disposed between the knuckle 101 and the lower arms 103 and 105.

The dust cover 115 may prevent a foreign substance from contaminating the lower arms 103 and 105 and the ball stud 111.

The conventional lower arm mounting unit 110 for a multi-link type suspension system, however, requires minimum distance D between the ball studs 111 of the lower arms 103 and 105 for mounting the lower arms 103 and 105 using a tool so that design degree of freedom and layout can be restricted.

Also, the conventional lower arm mounting unit 110 for a multi-link type suspension system requires lots of elements for individually mounting each lower arm 103 and 105 to the knuckle 101 so that total weight is increased and manufacturing cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a lower arm mounting unit for a multi-link suspension system of a vehicle having advantages that each lower arm can be relatively and independently moved in cross configuration, elements for mounting lower arms can be reduced, design degree of freedom and layout can be enhanced and manufacturing cost can be reduced.

A lower arm mounting unit for a multi-link suspension system having a knuckle rotatably supporting a wheel, and first and second lower arms connecting the knuckle to a vehicle body, may include a pair of mounting protrusions formed to the knuckle, a first ball stud connecting an end portion of the first lower arm to the pair of the mounting protrusions, and a second ball stud connecting an end portion of the second lower arm to the pair of the mounting protrusions and the first ball stud by inserting the end portion of the second ball stud between the pair of the mounting protrusions, the end portion of the first ball stud, and the knuckle.

The pair of the mounting protrusions may be formed to the knuckle monolithically.

A penetration hole may be formed to the respective mounting protrusion of the knuckle for inserting the first ball stud therethrough.

A thread may be formed to a distal end of the first ball stud for coupling the first ball stud to the pair of the mounting protrusions by engaging a nut to the thread.

An engaging groove may be formed to the end portion of the second ball stud for receiving the second ball stud thereto between the pair of the mounting protrusions, wherein a cross section of the engaging groove is shaped as a semicircle to receive a portion of outer circumference of the first ball stud thereto.

A dust cover may be disposed between the first and second ball studs and the mounting protrusions, wherein the dust cover includes, a first dust cover coupled to the first ball stud and disposed between the mounting protrusions and the end portion of the first lower arm, and a second dust cover coupled to the second ball stud and disposed between the mounting protrusions and the end portion of the second lower arm.

A lower arm mounting unit for a multi-link suspension system of a vehicle according to various aspects of the present invention can enhance design degree of freedom and layout by configuring each lower moved in cross configuration.

And lower arm mounting unit for a multi-link suspension system according to various aspects of the present invention can reduce elements for mounting lower arms and manufacturing cost and enhance assimilability and maintenance.

The methods and apparatuses of the present invention have other features and advantages which will be apparent from or are set forth in more detail in the accompanying drawings, which are incorporated herein, and the following Detailed

Figure 1:
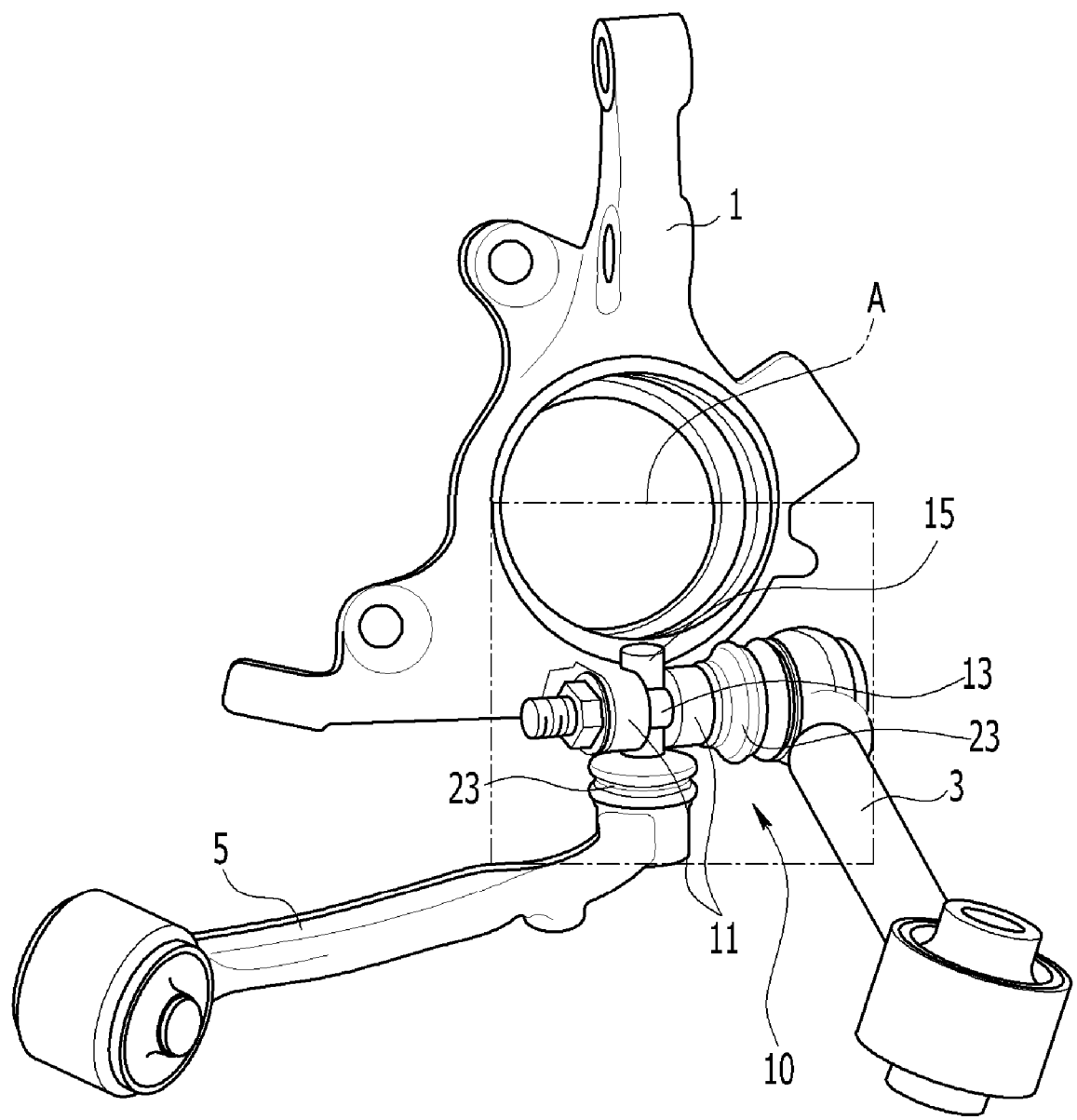
FIG. 1 is a perspective view of a lower arm mounting unit for a multi-link type suspension system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
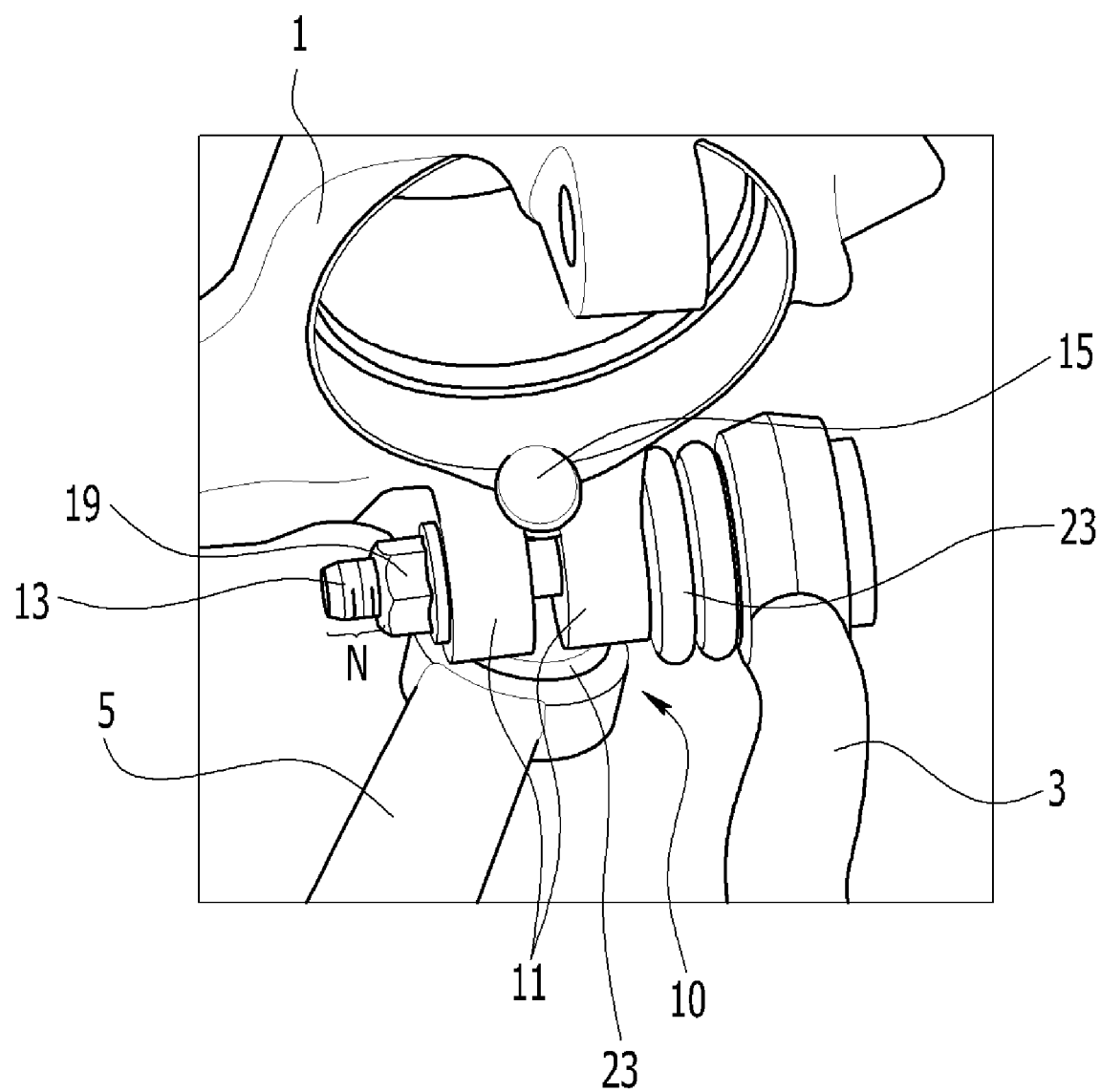
FIG. 2 is an expanded perspective view of A in FIG. 1.
Figure 3:
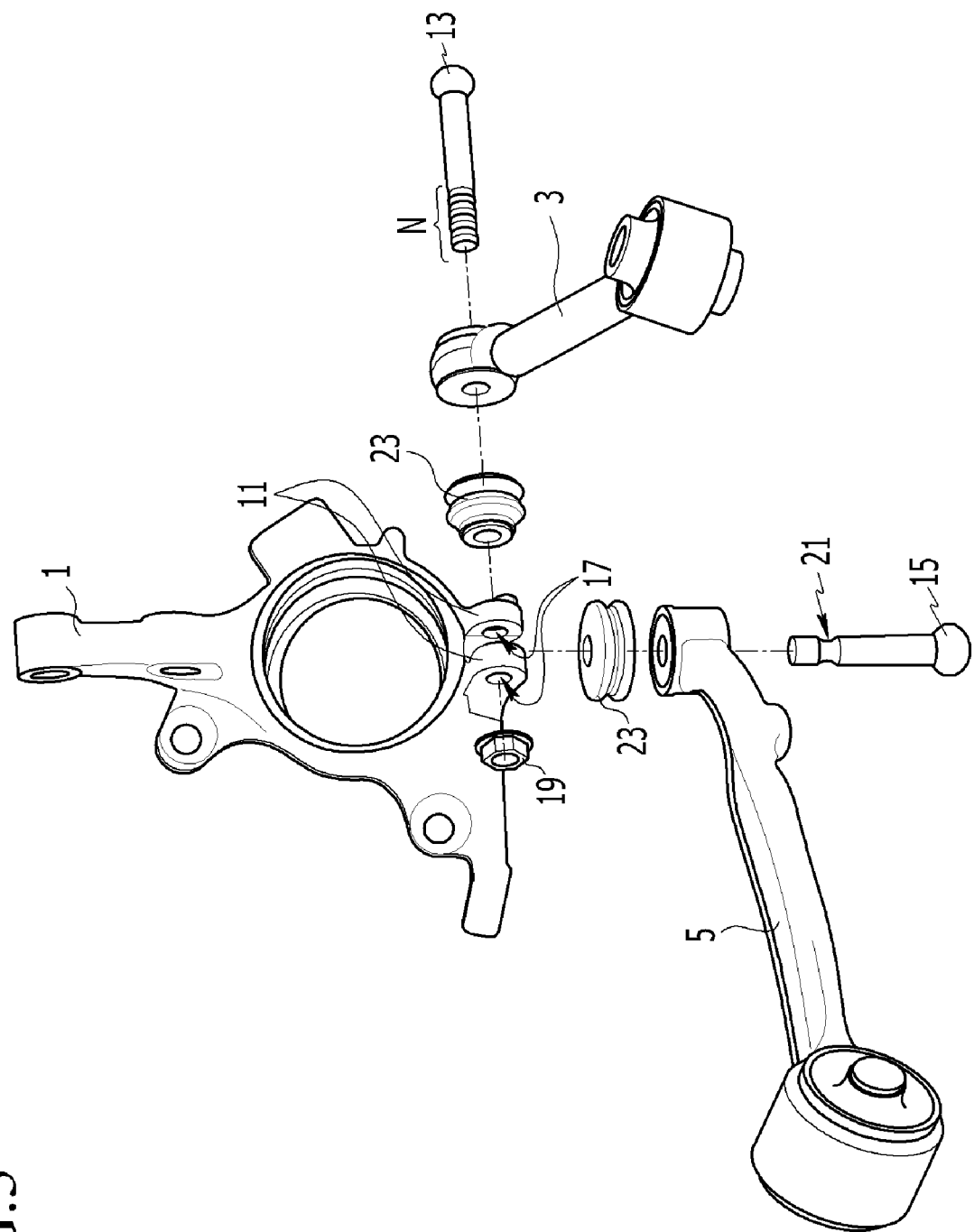
FIG. 3 is an exploded perspective view of a lower arm mounting unit for a multi-link type suspension system according to an exemplary embodiment of the present invention.
Figure 4:
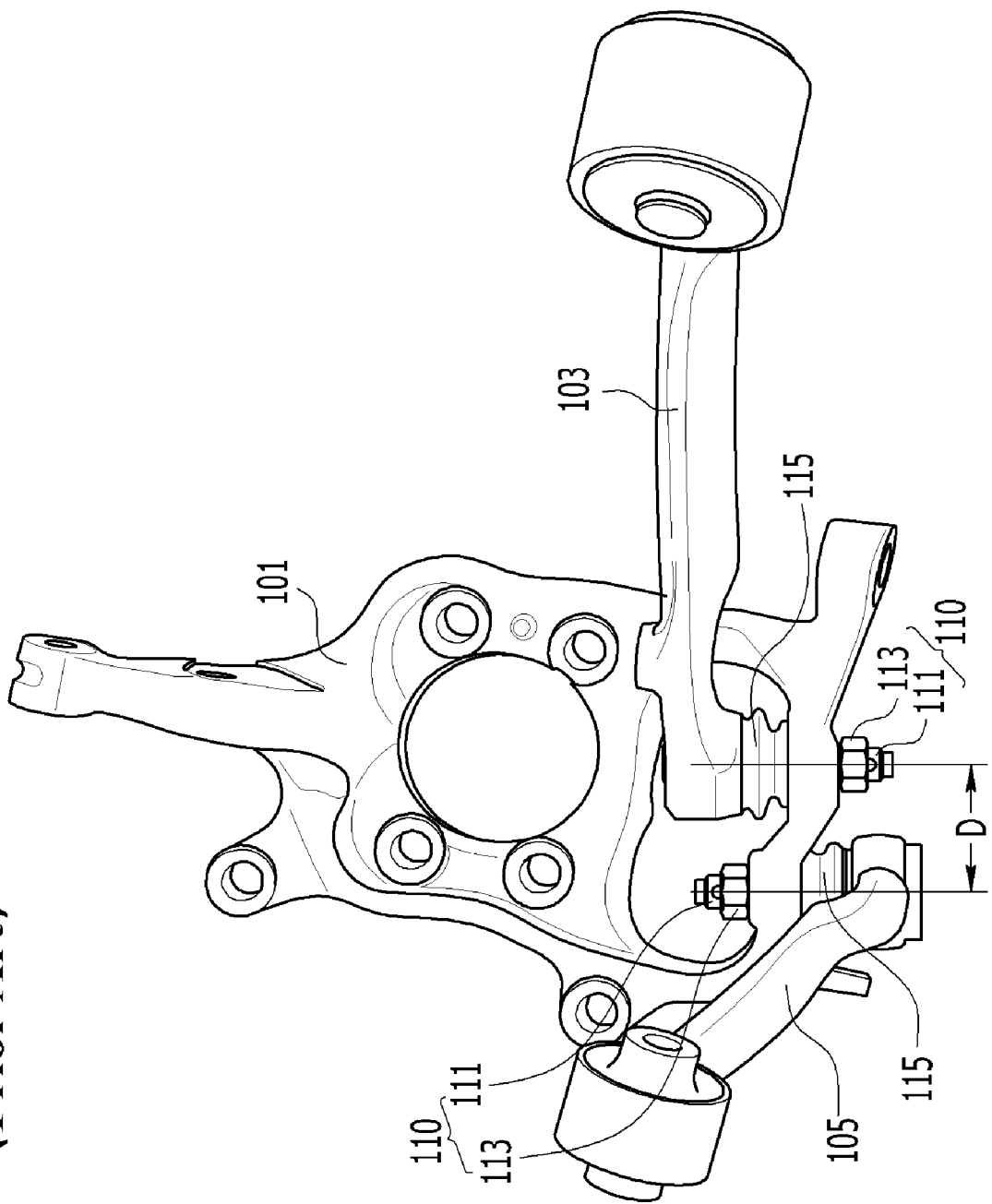
FIG. 4 is a perspective view of a conventional lower arm mounting unit for a multi-link type suspension system.

FIG. 1 is a perspective view of a lower arm mounting unit for a multi-link type suspension system according to an exemplary embodiment of the present invention, FIG. 2 is an expanded perspective view of A in FIG. 1 and FIG. 3 is an exploded perspective view of a lower arm mounting unit for a multi-link type suspension system according to an exemplary embodiment of the present invention.

Referring the drawings, a lower arm mounting unit 10 for a multi-link type suspension system according to an exemplary embodiment of the present invention includes a knuckle 1 rotatably supporting a wheel and a first and second lower arm 3 and 5 connecting the knuckle 1 to a vehicle body.

The lower arm mounting unit 10, as shown in FIG. 2 and FIG. 3, includes a mounting protrusion 11, a first ball stud 13 and a second ball stud 15.

The mounting protrusion 11, as a pair, is integrally formed to a lower portion of the knuckle 1 and the mounting protrusions 11 are separated from each other.

The mounting protrusions 11 are protruded to rearward of the knuckle 1.

A penetration hole 17 is formed to the mounting protrusion 11 for inserting the first ball stud 13 thereinto.

The first ball stud 13 is configured to an end of the first lower arm 3 and inserted into the penetration hole 17.

A thread N is formed to an end of the first ball stud 13 for engaging the first ball stud 13 to the mounting protrusion 11.

A nut 19 is engaged to the thread N and thus the first lower arm 13 is mounted to a lower portion of the knuckle 1.

The second ball stud 15 is configured to an end of the second lower arm 5.

The second ball stud 15 is inserted between the mounting protrusions 11 and the first ball stud 13 to form cross shape with the first ball stud 13, and the second ball stud 15 and the first ball stud 13 are able to move relatively and independently each other.

An engaging groove 21 is formed to the second ball stud 15 for engaging the second ball stud 15 to the first ball stud 13.

A cross section of the engaging groove 21 may be shaped as a semicircle.

That is, the second ball stud 15 and the first ball stud 13 cross each other and the second ball stud 15 is able to move relatively and independently against the first ball stud 13 around the engaging groove 21.

A dust cover 23 is disposed between the first and second ball stud 13 and 15 and mounting protrusion 11.

The dust cover 23 may prevent a foreign substance from contaminating the first and second ball stud 13 and 15.

Hereinafter, assembly and operations of the lower arm mounting unit for a multi-link type suspension system according to an exemplary embodiment of the present invention will be described.

The first and second ball stud 13 and 15 are respectively assembled to the end of the first and second lower arm 3 and 5.

And then the first ball stud 13 is inserted into the penetration holes 17 of the mounting protrusions 11.

The second ball stud 15 is inserted between the first ball stud 13 and the mounting protrusions 11 for the engaging groove 21 to be engaged to the first ball stud 13.

Engagement of the engaging groove 21 of the second ball stud 15 with the first ball stud 13 makes the first and second ball stud 13 and 15 as cross shape.

A rolling contact between the engaging groove 21 of the second ball stud 15 and the first ball stud 13 makes the second ball stud 15 and the first ball stud 13 move relatively and independently each other.

The first lower arm 3 is mounted to the knuckle 1 by engaging the nut 19 to the thread N and thus the second lower arm 5 is mounted to the knuckle 1.

Herein, the dust cover 23 is disposed between the first and second ball stud 13 and 15 and the mounting protrusions 11 so that the dust cover 23 can prevent a foreign substance from contaminating the first and second ball stud 13 and 15.

In the lower arm mounting unit 10 according to an exemplary embodiment of the present invention, the first and second lower arm 3 and 5 are mounted to the knuckle 1 by one nut 19.

Thus, the first and second lower arm 3 and 5 are engaged as cross shape with rolling contact and the first and second lower arm 3 and 5 can be relatively and independently moved.

With this scheme, the lower arm mounting unit 10 according to an exemplary embodiment of the present invention can enhance design degree of freedom.

And also, the lower arm mounting unit 10 according to an exemplary embodiment of the present invention can reduce total elements, manufacturing cost and assemble process and enhance assemble characteristic and maintenance.

For convenience in explanation and accurate definition in the appended claims, the terms "lower" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lower arm mounting unit for a multi-link suspension system having a knuckle rotatably supporting a wheel, and first and second lower arms connecting the knuckle to a vehicle body, the lower arm mounting unit comprising:
   a pair of mounting protrusions formed to the knuckle;
   a first ball stud connecting an end portion of the first lower arm to the pair of the mounting protrusions; and
   a second ball stud connecting an end portion of the second lower arm to the pair of the mounting protrusions and the first ball stud by inserting the end portion of the second ball stud between the pair of the mounting protrusions, the end portion of the first ball stud, and the knuckle.

2. The lower arm mounting unit of claim 1, wherein the pair of the mounting protrusions is formed to the knuckle monolithically.

3. The lower arm mounting unit of claim 1, wherein a penetration hole is formed to the respective mounting protrusion of the knuckle for inserting the first ball stud therethrough.

4. The lower arm mounting unit of claim 1, wherein a thread is formed to a distal end of the first ball stud for coupling the first ball stud to the pair of the mounting protrusions by engaging a nut to the thread.

5. The lower arm mounting unit of claim 1, wherein an engaging groove is formed to the end portion of the second ball stud for receiving the second ball stud thereto between the pair of the mounting protrusions.

6. The lower arm mounting unit of claim 5, wherein a cross section of the engaging groove is shaped as a semicircle to receive a portion of outer circumference of the first ball stud thereto.

7. The lower arm mounting unit of claim 1, wherein a dust cover is disposed between the first and second ball studs and the mounting protrusions.

8. The lower arm mounting unit of claim 7, wherein the dust cover includes:
   a first dust cover coupled to the first ball stud and disposed between the mounting protrusions and the end portion of the first lower arm; and
   a second dust cover coupled to the second ball stud and disposed between the mounting protrusions and the end portion of the second lower arm.

* * * * *